(12) United States Patent
Marchant

(10) Patent No.: US 10,637,143 B2
(45) Date of Patent: Apr. 28, 2020

(54) DUAL FREQUENCY RFID READER

(71) Applicant: Paxton Access Limited, Brighton, East Sussex (GB)

(72) Inventor: Simon Marchant, Brighton (GB)

(73) Assignee: Paxton Access Limited, Brighton (GB)

( * ) Notice: Subject to any disclaimer, the term of this patent is extended or adjusted under 35 U.S.C. 154(b) by 0 days.

(21) Appl. No.: 15/455,758

(22) Filed: Mar. 10, 2017

(65) Prior Publication Data

US 2017/0262670 A1    Sep. 14, 2017

(30) Foreign Application Priority Data

Mar. 10, 2016   (GB) .................................. 1604153.5

(51) Int. Cl.
| | |
|---|---|
| *H01Q 7/06* | (2006.01) |
| *H01Q 21/28* | (2006.01) |
| *H01Q 1/22* | (2006.01) |
| *G06K 19/077* | (2006.01) |
| *G06K 7/10* | (2006.01) |

(52) U.S. Cl.
CPC ............ *H01Q 7/06* (2013.01); *G06K 7/10356* (2013.01); *G06K 19/07767* (2013.01); *H01Q 21/28* (2013.01); *H01Q 1/2216* (2013.01)

(58) Field of Classification Search
CPC ...... H01Q 1/2208; H01Q 1/2216; H01Q 7/00; H01Q 7/06; H01Q 7/08; H01Q 21/28
See application file for complete search history.

(56) References Cited

U.S. PATENT DOCUMENTS

| | | | |
|---|---|---|---|
| 2002/0180574 A1* | 12/2002 | Toi ......................... | H01F 17/045 336/83 |
| 2005/0088357 A1 | 4/2005 | Hess et al. | |
| 2017/0040688 A1* | 2/2017 | Peralta ..................... | H01Q 7/00 |

FOREIGN PATENT DOCUMENTS

| | | |
|---|---|---|
| CN | 201966314 U | 9/2011 |
| CN | 202121074 U | 1/2012 |
| EP | 1605391 A1 | 12/2005 |
| EP | 2 429 033 A1 | 3/2012 |
| WO | 2008/016327 A1 | 2/2008 |
| WO | 2010/018546 A1 | 2/2010 |
| WO | 2010018546 A1 | 2/2010 |

OTHER PUBLICATIONS

Search Report for GB1604153.5, dated Sep. 6, 2016, four pages.
European Patent Office, European Search Report for EP 17 16 0129, date of search Jul. 27, 2017, Munich.

* cited by examiner

*Primary Examiner* — Robert Karacsony
(74) *Attorney, Agent, or Firm* — Tucker Ellis LLP

(57) ABSTRACT

An antenna system for a dual frequency RFID reader, having: a first antenna 206 arranged to operate at a first frequency, the first antenna comprising a conductive element in a substantially planar arrangement; and a second antenna 208 arranged to operate at a second frequency lower than the first frequency, the second antenna 208 comprising a substantially flat coil formed on a ferrite former 210; wherein the second antenna 208 is located substantially within the conductive element of the first antenna 206.

17 Claims, 2 Drawing Sheets

DUAL FREQUENCY RFID READER

This application claims priority to application, GB1604153.5, entitled DUAL FREQUENCY RFID READER, filed Mar. 10, 2016, which is incorporated herein by reference.

This invention relates to RFID readers, and in particular to dual frequency RFID readers.

Over the past decade or so, radio-frequency identification (RFID) has become an increasingly common technology. For example, RFID technology is extensively used in tracking products through production and delivery; monitoring health of livestock; and facilitating credit and debit card payments.

The general principle of RFID technology is that two components are designed to be able to exchange information with one another, using electromagnetic radiation at a pre-determined frequency. For example, 125 kHz and 13.56 MHz are commonly used frequencies. Typically RFID devices are small and relatively low powered, and devices may only successfully communicate with one another when the signal is strong enough. Since electromagnetic radiation reduces in intensity as distance from the source increases, this implies an upper limit on the separation between the two devices for information exchange to occur.

A key factor in the popularity of RFID technology is that it is only necessary to directly supply power to one device to allow communication between a pair of devices. In particular, one device may be powered, and set up to read and record data to other devices, and is sometimes referred to as an RFID reader. The other devices do not have a local power supply, and are sometimes referred to as RFID tags, or passive RFID tags. RFID tags can participate in information exchange with an RFID reader by using the signal emitted from the RFID reader to power the tag circuitry. In this way, RFID tags can be made very small and cheap, since batteries or other power sources are not required.

However, in order to power an RFID tag in this way, the reader must be capable of outputting a relatively strong signal, far stronger than would be required for communication alone. This requirement of strong signal strength typically means that passive RFID tags must be brought closer to a reader than active (powered) RFID tags, for otherwise equivalent system designs.

In order to communicate with RFID tags designed to operate at a specific frequency, an RFID reader must have an antenna arranged to operate on that same frequency. Therefore, in order for an RFID reader to be able to communicate with a variety of RFID tags, which are designed to operate at a variety of frequencies, an RFID reader requires a separate antenna for each different RFID tag frequency of interest.

When two antennas are located close to one another, a reduction in signal strength is seen, due to mutual coupling. In effect, this is a situation in which power radiated by one of the antennas is picked up by the second, instead of radiating further. The second antenna acts like a short circuit, so power is dissipated in the second antenna, and does not radiate further. The net effect of this is to reduce the effective power emitted by the first antenna. Clearly in the case of an RFID system employing passive RFID tags, this will reduce the effective communication distance even further. In other words, an RFID reader having more than one antenna would need more power to communicate with a passive RFID tag than a single-antenna RFID reader would, if the tag-reader separation is fixed.

This problem could be alleviated by simply moving the antennas far apart from one another, but this would conflict with the general trend to make RFID systems more compact. In addition, passive tag systems typically require a reader-tag separation of no more than a few centimetres, so large separations of the two antennas would require users to present their tag to different portions of the reader depending on the tags operational frequency, which may not even be known to the user.

According to an aspect of the present invention, there is provided an antenna system for a dual frequency RFID reader, having: a first antenna arranged to operate at a first frequency, the first antenna comprising a conductive element in a substantially planar arrangement; and a second antenna arranged to operate at a second frequency lower than the first frequency, the second antenna comprising a substantially flat coil formed on a ferrite former; wherein the second antenna is located substantially within the conductive element of the first antenna. Advantageously, the ferrite former helps to direct the signal emitted from the second antenna away from the first antenna, thereby reducing the mutual coupling between the antennas. This allows a dual frequency RFID reader to be made in a compact manner, without sacrificing power and efficiency.

In this context, the term a substantially planar arrangement means that the conductive element which comprises the antenna is formed of lengths of conductive material, curved or bent into a particular shape, in which the shape into which the material is curved or bent lies largely in the same plane. That is, despite any curves or bending, the conductive material nevertheless lies in a single plane. In some cases the material may be formed into multiple loops. Multiple loops may be formed as a set of loops, each successive one encompassing an adjacent loop, so that the antenna as a whole, that is the full set of loops, remains substantially planar.

Alternatively, as in the case of the second antenna, the coil may comprise multiple loops, which may be formed helically. In this case adjacent loops occupy planes which are marginally offset from one another. Typically in these cases, the offset will be small relative to the other dimensions of the antenna, and the antenna is therefore substantially flat. That is, the second antenna is also substantially planar, and plane of this antenna shall be considered to be perpendicular to the offset direction (that is, along the axis of the helix), and located midway between the two ends of the helix formed in this manner.

Of course, it is possible that the helical arrangement of multiple loops may also be combined with the concentric arrangement of multiple loops described above, in which case corresponding comments apply. In any case taking these ideas into account, the plane of the first antenna is broadly parallel with the plane of the second antenna.

In the above examples of planar arrangements, the curved or bent nature of the conductive material which forms the antenna means that the antenna will typically describe a two dimensional shape, and therefore occupy a two dimensional area, in the plane. This is even more apparent when the conductive material forms a loop. Putting this another way, the shape of each antenna will occupy an area in the plane of the antenna.

The two planes overlapping each other means that when the areas occupied by the antennas are viewed along an axis perpendicular to the plane of one or both of the antennas, there will be portions of the view which correspond to areas occupied by both antennas. Put another way, the second antenna is located substantially within the conductive element of the first antenna. This means most or all of the area that the second antenna occupies overlaps parts of the area which the first antenna occupies.

Optionally second antenna is located entirely within the conductive element of the first antenna. This aids in producing a compact RFID reader.

Optionally, the ferrite former further comprises a flange located between the first and second antennas. The flange increases the effectiveness of the arrangement by providing a shielding effect.

Optionally, the first antenna is formed on a printed circuit board. Moreover, the second antenna may be coplanar with the first antenna. This close separation allows a compact RFID reader to be made. In this case, the planes which the antennas occupy may be offset from one another in a distance perpendicular to each plane. Alternatively, there may be no such offset, and the antennas may occupy the same plane. For example, the two antennas may have a nested arrangement, where one is larger than the other, so that the smaller one is completely surrounded by the larger one. In this case, they may remain identifiably separate entities, yet still occupy the same plane.

Optionally, the first antenna is a tracked antenna forming a loop. Such antennas are easy to form on a suitable substrate. Moreover, the loop of the first antenna may have a plurality of turns, for example between 2 and 10 turns. Multiple turns in a single antenna allow for an improved efficiency of the antenna, without increasing the size of the reader as a whole.

Optionally, the coil second antenna may be wire wound directly around a portion of the ferrite former. This provides a convenient method for manufacturing the second antenna. The coil of the second antenna may have a plurality of turns, for example it may have between 10 and 500 turns, for example, between 200 and 250 turns. Multiple turns in a single antenna allow for an improved efficiency of the antenna, without increasing the size of the reader as a whole. Additionally, the number of turns may be between 50 and 150 or between 100 and 300.

Optionally, the first antenna occupies an area larger than 350 $mm^2$. Optionally the second antenna occupies an area smaller than 350 $mm^2$.

Optionally, the ferrite former is manufactured from a material having an initial relative permeability of between 250 and 350. This helps the ferrite former to channel the magnetic flux, and hence the signal, of the second antenna along the body of the former, and away from the first antenna.

Optionally, the maximum working frequency of the ferrite former is less than 3 MHz, and further optionally, the maximum working frequency of the ferrite former is greater than 100 kHz. This allows the ferrite former to be particularly effective at channelling magnetic flux at low frequencies, but to be effectively invisible at higher frequencies.

The ferrite former may be manufactured as a single piece. This improves the overall magnetic characteristics of the ferrite former, and provides a mechanically robust component.

The first frequency may be at least 10 times the second frequency, for example the first frequency may be greater than 10 MHz, while the second frequency may be lower than 160 kHz. More particularly, the first frequency may be about 13.56 MHz, and the second frequency may be about 125 kHz. This allows the dual frequency reader to operate at known frequencies, and therefore to comply with industry standards.

Embodiments of the present invention are described with reference to the attached Figures, in which.

Figure 1:
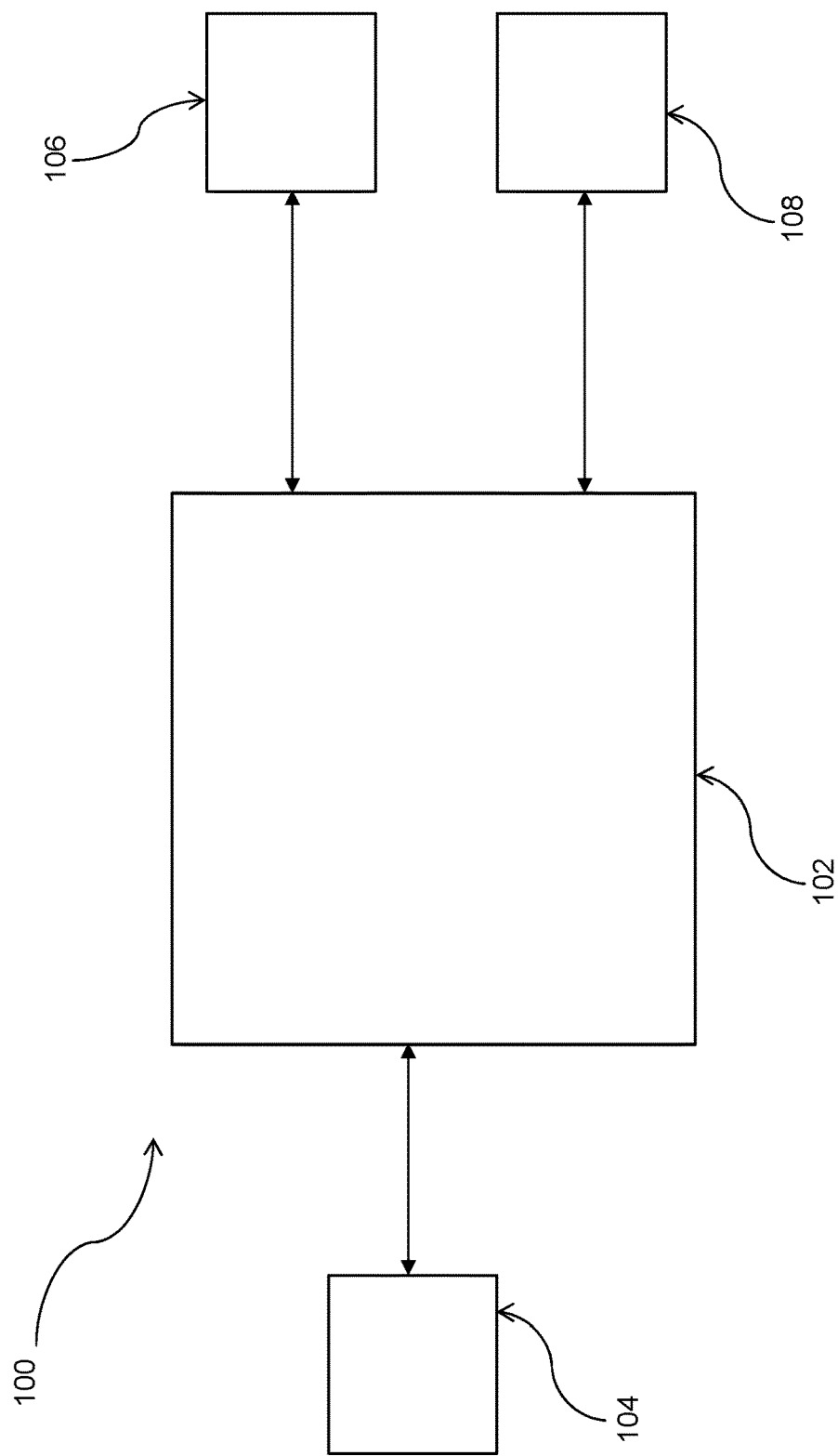
FIG. 1 shows a block diagram representing a dual frequency RFID reader.

According to FIG. 1, there is shown a block diagram of a dual frequency RFID reader system 100 according to the present invention. The system comprises a controller 102, a first antenna 108, a second antenna 106 and one or more input and/or output devices, schematically represented by numeral 104.

In operation, the controller 100 is arranged to provide a signal at a first frequency to the first antenna 106, and another signal at a second frequency to the second antenna 108. Typically this is arranged by providing each antenna with a different set of driving circuitry, thereby providing driving signals at different frequencies. In the event that an RFID tag is brought close to the antennas 106, 108 the signal output by each antenna may interrogate the tag, possibly also providing power to it, and if the tag is arranged to operate at one of the two frequencies, it may respond, by returning information to the reader as an electromagnetic signal. The information is returned by the tag modulating the carrier signal in a way which is detectable by the reader. The tag switches a resistor load in and out of its circuit to force absorption of the carrier, thereby reducing its amplitude in a detectable way.

The two antennas 106, 108 will typically be arranged close to one another. That is to say, the regions in which a tag arranged to operate at the correct frequency may be read by the first antenna 106 may overlap with the regions in which a tag arranged to operate at the second frequency may be read by the second antenna 108. The regions in which tags may be read by each antenna may even be substantially the same region.

Examples of input devices 104 include computers or data storage devices, e.g. to provide information to be encoded into a signal; triggers or buttons to activate the reader; or sensors to determine information about the environment, RFID system or users thereof. These input 104 devices may cause the RFID reader to broadcast an interrogative, powering or communicative signal at one or both of the frequencies (separately or together) at which its antennas 106, 108 operate. The reader may broadcast these signals only when certain criteria are met, periodically, or at all times, depending on the desired functionality.

Output devices 104 may include, for example, electronic locks; lights; buzzers; electrically operated doors or a data storage device or computer, arranged to receive and store information. These output devices 104 may be selectively activated depending on the information received from a tag which has been read by the reader.

Figure 2:
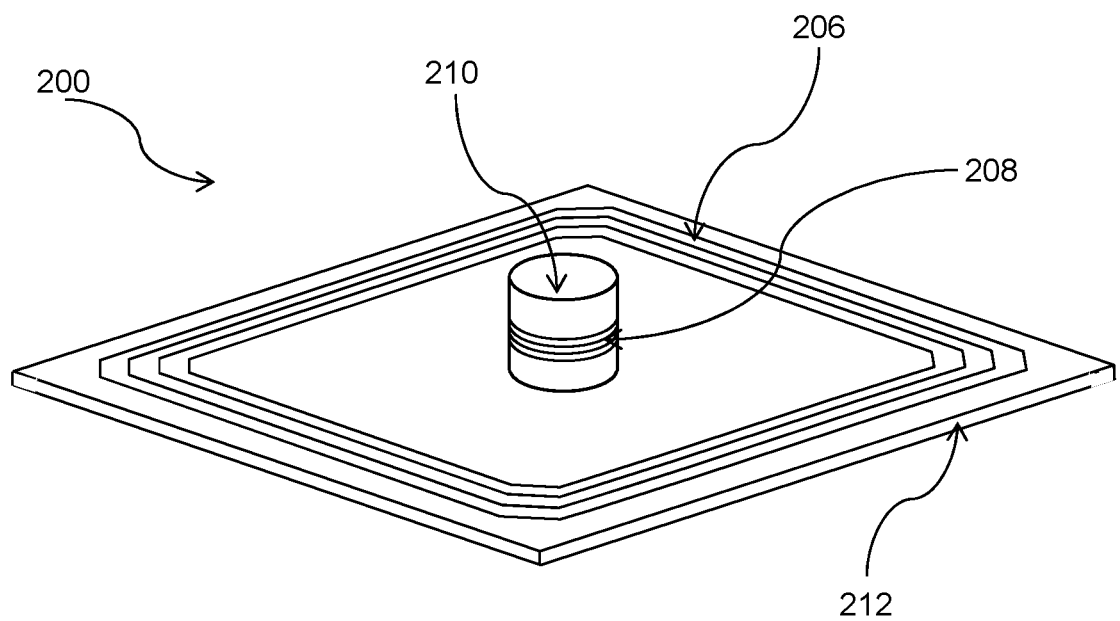
FIG. 2 shows a perspective view of a design of an antenna system according to an embodiment of the present invention.

Turning now to FIG. 2, a dual antenna system 200 according to an embodiment of the present invention is shown. Here, a second antenna 208 is formed on a generally cylindrical ferrite former 210. The ferrite former 210 need not be cylindrical, but any shape which allows the second antenna 208 to be formed on it is possible. This includes prismatic shapes with polygonal cross sections and hollow shapes, for example.

In this embodiment, the second antenna 208 is a wound wire antenna. Of course, this is only one way of forming an antenna 208 on a ferrite former 210. Other viable methods will be apparent to those skilled in the art. Although only four turns are shown comprising the second antenna 208, the actual number may be lower than this, for example a single turn, or indeed significantly higher than this, including tens, hundreds or even thousands of turns. Similarly, the antenna 208 need not even completely encircle the ferrite former 210, but may simply take the form of an arc.

In this example, the second antenna 208 takes the form of a helix. Since it is wound around the outside of the ferrite former 210, it shares its axis with the axis of the cylindrical ferrite former, and consequently occupies a plane which is perpendicular to this axis. Similarly, it occupies an area in this plane which is approximately circular in shape, due to its close conformance to the exterior of the ferrite former 210.

The helical form of the second antenna 208 has been exaggerated in this example. That is to say it, the extent to which the antenna 208 extends along the axis of the ferrite former 210 is greater than would typically be the case. In fact, a coiled wire antenna of this type would usually have a large ratio between its diameter and its thickness. For example, the diameter may be 10 times, 20 times, 50 times or even 100 times the thickness of the antenna. With these dimensions, the antenna could be thought of as being substantially flat.

The ferrite former 210, along with the second antenna 208 is mounted on a substrate 212, close to the centre. A suitable substrate is an electrically insulating material, for example a glass epoxy, such as those used in the substrates of printed circuit boards.

Surrounding the location at which the ferrite former 210 is joined to the substrate 212 is a first antenna 206, formed as a tracked antenna directly on the substrate 212. The tracked antenna 206 has the shape of an irregular octagon, although any shape is in principle possible, for example: circles, ellipses, squares, or regular or irregular polygons in general. In fact, the antenna 206 need not even be a closed shape, and may have the shape of an arc, or a series of connected line segments. Additionally, the antenna need not be a tracked antenna, but could be formed by laying wire down onto the substrate 212, or by any other suitable means, as would be apparent to one skilled in the art. Finally, although four turns of tracked antenna 206 are shown, the actual number may be lower than this, for example a single turn, or indeed significantly higher than this, including tens, hundreds or even thousands of turns. In this embodiment, the first antenna 206 is arranged to operate at a higher frequency than the second antenna 208.

Note that in this example, the substrate 212 is flat. Since the antenna 206 is formed directly on this substrate, the antenna 206 is itself substantially flat, and planar. Moreover the outermost loop of the first antenna 206 defines the area which the antenna occupies. In this example, the second antenna 208 is mounted some distance along the ferrite former 210 from the point at which the ferrite former 210 is attached to the substrate 212. This means that the plane of the second antenna 208 is spaced apart from the plane of the first antenna 206. However, it would be possible for the two antennas 208, 206 to be coplanar by winding the second antenna 208 closer to one end of the ferrite former 212, or by forming a recess in the substrate 212, into which the ferrite former 210 can be inserted.

In addition, since the area occupied by the second antenna 208 is smaller than the area occupied by the first antenna 206, the second antenna 208 is located entirely within the area occupied by the first antenna 206. That is to say the footprint of the second antenna 208 overlaps a part of the footprint of the first antenna 206, and every part of the footprint of antenna 208 corresponds to a part of the footprint of antenna 206.

Moreover, it can be seen that the first antenna 206 completely surrounds the second antenna 208 as well as the ferrite former 210. In fact, the ferrite former 210 and second antenna 208 are situated substantially in the centre of the first antenna 206. However, it is not essential that the ferrite former 210 and second antenna 208 are situated substantially in the centre of the first antenna 206, but may be situated close to the conductive element of the first antenna 206, or even partially overlapping the conductive element of the first antenna 206.

In operation, the control circuitry (not shown, but discussed in relation to FIG. 1) supplies a signal to one or both of the antennas 206, 208. By virtue of its close proximity to the ferrite former 210, the signal from the second antenna 208 is directed away from the substrate 212, rather than towards the first antenna 206. In addition, the ferrite material may be chosen so that it is invisible to the first antenna 206, by setting the frequency at which the first antenna 206 operates higher than the working frequency of the ferrite former 210. This prevents the first antenna 206 from becoming strongly inductively coupled to the second antenna 208, and thereby improves efficiency.

Figure 3:
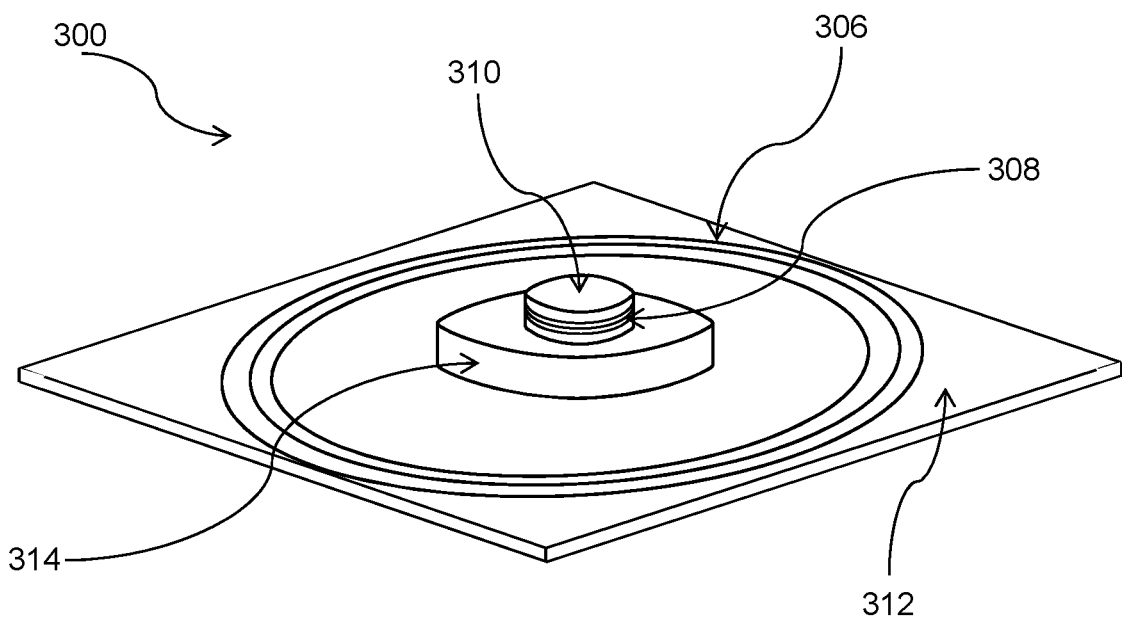
FIG. 3 shows a perspective view of another design of antenna system according to an embodiment of the present application.

Turning now to FIG. 3, a dual antenna system 300 according to another embodiment of the present invention is shown. In this figure, similar elements are shown to those in FIG. 2, and correspondingly are identified with similar reference numerals. In particular, the second antenna 308 is once again wound on a ferrite former 310, which is secured to a substrate 312. In this embodiment, second antenna 308 is once more formed on a generally cylindrical portion of ferrite former 310. This part of the ferrite former 310 need not be cylindrical, but any shape which allows the second antenna 308 to be formed on it is possible. This includes prismatic shapes with polygonal cross sections and hollow shapes, for example.

In this embodiment, the second antenna 308 is a wound wire antenna. Of course, this is only one way of forming an antenna 308 on a part of ferrite former 310. Other viable methods will be apparent to those skilled in the art. Although only three turns are shown comprising the second antenna 308, the actual number may be lower than this, for example a single turn, or indeed significantly higher than this, including tens, hundreds or even thousands of turns. Similarly, the antenna 308 need not even completely encircle the ferrite former 310, but may simply take the form of an arc.

In this example, the second antenna 308 takes the form of a helix. Since it is wound around the outside of the ferrite former 310, it shares its axis with the axis of the cylindrical ferrite former, and consequently occupies a plane which is perpendicular to this axis. Similarly, it occupies an area in this plane which is approximately circular in shape, due to its close conformance to the exterior of the ferrite former 310.

The helical form of the second antenna 308 has been exaggerated in this example. That is to say it, the extent to which the antenna 308 extends along the axis of the ferrite former 310 is greater than would typically be the case. In fact, a coiled wire antenna of this type would usually have a large ratio between its diameter and its thickness. For example, the diameter may be 10 times, 20 times, 50 times or even 100 times the thickness of the antenna. With these dimensions, the antenna could be thought of as being substantially flat.

The ferrite former 310, along with the second antenna 308 is mounted on a substrate 312, close to the centre. A suitable substrate is an electrically insulating material, for example a glass epoxy, such as those used in the substrates of printed circuit boards.

Surrounding the location at which the ferrite former 310 is joined to the substrate 312 is a first antenna 306, formed as a tracked antenna directly on the substrate 312. The tracked antenna 306 has an elliptical shape, although any shape is in principle possible, for example: circles, squares, or regular or irregular polygons in general. In fact, the antenna 306 need not even be a closed shape, and may have the shape of an arc, or a series of connected line segments. Additionally, the antenna need not be a tracked antenna, but could be formed by laying wire down onto the substrate 312, or by any other suitable means, as would be apparent to one skilled in the art. Finally, although four turns of tracked antenna 306 are shown, the actual number may be lower than this, for example a single turn, or indeed significantly higher than this, including tens, hundreds or even thousands of turns. In this embodiment, the first antenna 306 is arranged to operate at a higher frequency than the second antenna 308.

Note that in this example, the substrate 312 is flat. Since the antenna 306 is formed directly on this substrate, the antenna 306 is planar. Moreover the outermost loop of the first antenna 306 defines the area which the antenna occupies. In this example, the first antenna 306 is mounted some distance along the ferrite former 310 from the point at which the ferrite former 310 is attached to the substrate 312. This means that the plane of the first antenna 306 is spaced apart from the plane of the first antenna 306. However, it would be possible for the two antennas 306, 308 to be coplanar by winding the second antenna 308 closer to the end of the ferrite former 310 which is joined to the substrate 312, or by forming a recess in the substrate 312, into which the ferrite former 310 can be inserted.

In addition, since the area occupied by the second antenna 308 is smaller than the area occupied by the first antenna 306, the second antenna 308 is located entirely within the area occupied by the first antenna 306. That is to say the footprint of the second antenna 308 overlaps a part of the footprint of the first antenna 306, and every part of the footprint of antenna 308 corresponds to a part of the footprint of antenna 306.

An additional feature may be seen in the form of a flange 314 integrally formed with the ferrite former 310. That is to say, the combination of the flange 314 and the ferrite former 310 is formed as a single piece, and from a single material, in this embodiment. Put another way, the ferrite former 310 and the flange 314 may be formed by taking a larger piece of ferrite, and removing unwanted material until a top-hat shape remains. In this way, the ferrite former 310 and the flange 314 form a single part.

Moreover, it can be seen that the first antenna 306 completely surrounds the second antenna 308 as well as the ferrite former 310. In fact, the ferrite former 310 and second antenna 308 are situated substantially in the centre of the first antenna 306. However, it is not essential that the ferrite former 310 and second antenna 308 are situated substantially in the centre of the first antenna 306, but may be situated close to the conductive element of the first antenna 306, for example with the flange 314 overlapping the conductive element of the first antenna 306. In fact, the second antenna 308 itself may even partially overlap the conductive element of the first antenna 306.

In operation, the control circuitry (not shown, but discussed in relation to FIG. 1) supplies a signal to one or both of the antennas 306, 308. By virtue of its close proximity to the ferrite former 310, the signal from the second antenna 308 is directed away from the substrate 312, rather than towards the first antenna 306. In addition, the ferrite material may be chosen so that it is invisible to the first antenna 306, by setting the frequency at which the first antenna 306 operates higher than the working frequency of the ferrite former 310. This prevents the first antenna 306 from becoming strongly inductively coupled to the second antenna 308, and thereby improves efficiency. In this embodiment, the flange helps to direct the signal away from the substrate 312, and not towards the first antenna 306, as well as providing a shielding effect.

A particularly suitable ferrite material for constructing the ferrite former 210, 310 has been identified, which has the following properties:

| Property | Unit | Value |
| --- | --- | --- |
| Initial relative permeability | (none) | 300 ± 25% |
| $\tan(\delta)/\mu_i$ | (none) | $2 \times 10^{-5}$ (at 0.3 MHz) |
| Saturation flux density | Tesla (T) | 0.27 (at 25° C.) |
| Coercive Force | Amperes/metre (A/m) | 0.006 |
| Residual flux density | Tesla (T) | 0.145 |
| Curie Temperature | Degrees centigrade (° C.) | 160 |
| Volume resistivity | Ohm-metres (Ωm) | $10^5$ |
| Working frequency | Megahertz (MHz) | 0.1-3 |
| Density | Kg/m$^3$ | 4800 |

Using this material, an effective dual antenna system can be made, which includes a disc shaped ferrite former can be made around 20 mm across and around 3.1 mm thick. Alternatively, it can include a top hat shaped ferrite former, wherein the flanged portion is around 35 mm across, and around 1.9 mm thick, with a central protrusion upon which the coiled antenna is formed which extends around 1.2 mm from the flanged portion, and is itself around 20 mm across.

The invention claimed is:

1. An antenna system for a dual frequency RFID reader, having:
    a first antenna arranged to operate at a first frequency, the first antenna comprising a conductive element in a substantially planar arrangement extending around a first axis; and
    a second antenna arranged to operate at a second frequency lower than the first frequency, the second antenna comprising a coil around a second axis and formed on a ferrite former;
    wherein the second antenna is located substantially within the conductive element of the first antenna;
    wherein the ferrite former further comprises a flange located between the first and second antennas;
    wherein the first and second axes are substantially parallel with one another; and
    wherein the ferrite former is manufactured as a single piece.

2. An antenna system according to claim 1, wherein the second antenna is located entirely within the conductive element of the first antenna.

3. An antenna system according to claim 1, wherein the first antenna is formed on a printed circuit board.

4. An antenna system according to claim 1, wherein the first antenna is a tracked antenna forming a loop.

5. An antenna system according to claim 4, wherein the loop of the first antenna has a plurality of turns.

6. An antenna system according to claim 5, wherein the second antenna is wound directly around a portion of the ferrite former.

7. An antenna system according to claim 5 or 6, wherein the coil of the second antenna has a plurality of turns, preferably wherein the coil of the second antenna has between 50 and 150 turns.

8. An antenna system according to claim 1, wherein the first antenna occupies an area larger than 350 mm$^2$, and/or wherein the second antenna occupies an area smaller than 350 mm$^2$.

9. An antenna system according to claim 1, wherein the second antenna occupies an area smaller than 350 mm$^2$.

10. An antenna system according to claim 1, wherein the ferrite former is manufactured from a material having an initial relative permeability of between 250 and 350.

11. An antenna system according to claim 1, wherein the maximum working frequency of the ferrite former is 3 MHz or less.

12. An antenna system according to claim 1, wherein the maximum working frequency of the ferrite former is greater than 100 kHz.

13. An antenna system according to claim 1, wherein the first frequency is at least 10 times the second frequency.

14. An antenna system according to claim 1, wherein the first frequency is greater than 10 MHz.

15. An antenna system according to claim 1, wherein the first frequency is about 13.56 MHz.

16. An antenna system according to claim 1, wherein the second frequency is lower than 160 kHz.

17. An antenna system according to claim 1, preferably wherein the second frequency is about 125 kHz.

* * * * *